United States Patent
Xu et al.

(10) Patent No.: US 9,735,942 B2
(45) Date of Patent: Aug. 15, 2017

(54) PHYSICAL BROADCAST CHANNEL (PBCH) COVERAGE ENHANCEMENTS FOR MACHINE TYPE COMMUNICATIONS (MTC)

(71) Applicant: QUALCOMM Incorporated, San Diego, CA (US)

(72) Inventors: Hao Xu, San Diego, CA (US); Wanshi Chen, San Diego, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 14/245,370

(22) Filed: Apr. 4, 2014

(65) Prior Publication Data

US 2014/0301305 A1 Oct. 9, 2014

Related U.S. Application Data

(60) Provisional application No. 61/809,232, filed on Apr. 5, 2013.

(51) Int. Cl.
*H04W 72/04* (2009.01)
*H04L 5/00* (2006.01)

(52) U.S. Cl.
CPC ........... *H04L 5/0053* (2013.01); *H04W 72/04* (2013.01)

(58) Field of Classification Search
None
See application file for complete search history.

(56) References Cited

U.S. PATENT DOCUMENTS

2011/0293037 A1* 12/2011 Liu .................. H04L 5/001
   375/295
2013/0039284 A1* 2/2013 Marinier .......... H04L 5/001
   370/329

(Continued)

FOREIGN PATENT DOCUMENTS

WO WO-2010085909 A1 8/2010
WO WO-2013025547 A2 2/2013

OTHER PUBLICATIONS

International Search Report and Written Opinion—PCT/US2014/033107—ISA/EPO—Oct. 13, 2014.

(Continued)

*Primary Examiner* — Robert C Schiebel
(74) *Attorney, Agent, or Firm* — Patterson & Sheridan, L.L.P.

(57) ABSTRACT

Aspects of the present disclosure provide techniques and apparatus for physical broadcast channel (PBCH) coverage enhancements, for example, for machine type communications (MTC). In aspects, the PBCH coverage enhancements may be applied by non-MTC devices. A method for wireless communications typically performed by a base station (BS) is provided. The method generally includes determining a set of resources for a new physical broadcast channel (PBCH) with enhanced coverage relative to a legacy PBCH and communicating to at least one user equipment (UE) based on the determined set of resources for the new PBCH. In aspects, the new PBCH may be transmitted on a subframe allocated for communicating with MTC devices (MTC subframe).

31 Claims, 11 Drawing Sheets

(56) References Cited

U.S. PATENT DOCUMENTS

| | | | |
|---|---|---|---|
| 2013/0114522 A1* | 5/2013 | Frenne | H04L 5/0094 370/329 |
| 2013/0121317 A1* | 5/2013 | Lee | H04L 5/0042 370/336 |
| 2013/0250878 A1* | 9/2013 | Sayana | H04W 4/005 370/329 |
| 2014/0098761 A1* | 4/2014 | Lee | H04W 74/0833 370/329 |
| 2015/0146629 A1* | 5/2015 | Ranta-aho | H04W 72/0453 370/329 |
| 2015/0296518 A1* | 10/2015 | Yi | H04L 5/0048 370/336 |

OTHER PUBLICATIONS

Alcatel-Lucent, et al., "Feasibility of coverage extension of physical channels for MTC devices," 3GPP Draft; R1-130462—REL-12 MTC Coverage—Coverage EXT PHY Channels V0.3, 3rd Generation Partnership Project (3GPP), Mobile Competence Centre; 650, Route Des Lucioles; F-06921 Sophia-Antipoles C, vol. RAN WG1, No. St Julian; Jan. 28, 2013-Feb. 1, 2013, Jan. 19, 2013 (Jan. 19, 2013), XP050663744, 7 pages, Retrieved from the Internet < URL : http://www/3gpp.org/ftp/tsg_ran/WG1_RL1/TSGR1_72/Docs/ >, [retrieved on Jan. 19, 2013].

China Telecom: "Discussion on coverage improvement for MTC", 3GPP Draft; R1-130353, 3rd Generation Partnership Project(3GPP), Mobile Competence Centre; 650, Route Des Lucioles; F-06921 Sophia-Antipolis Cedex; France,vol. RAN WG1, No. St Julian; Jan. 28, 2013-Feb. 1, 2013, Jan. 18, 2013 (Jan. 18, 2013), XP050663436, Retrieved from the Internet:URL:http://www.3gpp.org/ftp/tsg_ran/WG1_RL1/TSGR1_72/Docs/[retrieved on Jan. 18, 2013].

Huawei et al., "Coverage enhancement for physical channels and signals for low-cost MTC",3GPP Draft; R1-130017, 3rd Generation Partnership Project (3GPP), Mobile Competence Centre; 650, Route Des Lucioles; F-06921 Sophia-Antipolis Cedex; France, vol. RAN WG1, No. St . Julian; Jan. 28, 2013-Feb. 1, 2013, Jan. 19, 2013 (Jan. 19, 2013), XP050663499, Retrieved from the Internet:URL:http://www.3gpp.org/ftp/tsg_ran/WG1_RL1/TSGR1_72/Docs/[retrieved on Jan. 19, 2013].

Mediatek Inc: "On Required System Functionalities for MTC UEs Operating in Enhanced Coverage Mode", 3GPP Draft; R1-130218 on Required System Functionalities for MTC UEs Operating in Enhanced Coverage Mode, 3rd Generation Partnership Project (3GPP), Mobile Competence Centre ; 650, Route Des Lucioles vol. RAN WG1, No. St Julian; Jan. 28, 2013-Feb. 1, 2013 Jan. 19, 2013 (Jan. 19, 2013), XP050663598, Retrieved from the Internet: URL:http://www.3gpp.org/ftp/tsg_ran/WGI_RLI/TSGRI_72/Docs/ [retrieved on Jan. 19, 2013], section 2.2 System Information.

Partial International Search Report—PCT/US2014/033107—ISA/EPO—Jul. 18, 2014.

Qualcomm Incorporated: "Coverage Enhancement Techniques for MTC," 3GPP Draft; R1-125120 Coverage Enhancement Techniques for MTC, 3rd Generation Partnership Project (3GPP), Mobile Competence Centre; 650, Route Des Lucioles; F-06921 Sophia-Antipolis Cedex; France, vol. RAN WG1, No. New Orleans, USA; Nov. 12, 2012-Nov. 16, 2012, Nov. 3, 2012 (Nov. 3, 2012), 7 pages, XP050662981, Retrieved from the Internet < URL: http://www.3gpp.org/ftp/tsg_ran/WG1_RL1/TSGR1_71/Docs >, [retrieved on Nov. 3, 2012], the whole document.

* cited by examiner

PHYSICAL BROADCAST CHANNEL (PBCH) COVERAGE ENHANCEMENTS FOR MACHINE TYPE COMMUNICATIONS (MTC)

CLAIM OF PRIORITY UNDER 35 U.S.C. §119

This application claims benefit of U.S. Provisional Patent Application Ser. No. 61/809,232, filed Apr. 5, 2013, which is herein incorporated by reference in its entirety.

BACKGROUND

I. Field

Certain aspects of the present disclosure generally relate to wireless communications and, more particularly, to techniques for physical broadcast channel (PBCH) coverage enhancements for machine type communications (MTC).

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

Wireless devices may include user equipments (UEs). Some examples of UEs may include cellular phones, smart phones, personal digital assistants (PDAs), wireless modems, handheld devices, laptop computers, netbooks, etc. Some UEs may be considered machine type communication (MTC) UEs, which may include remote devices such as sensors, meters, location tags, etc. A remote device may communicate with a base station, another remote device, or some other entity. Machine type communication (MTC) may refer to communication involving at least one remote device on at least one end of the communication.

SUMMARY

Techniques and apparatus are provided herein for physical broadcast channel (PBCH) coverage enhancements. In aspects, the techniques may be applicable for machine type communications (MTC). In aspects, the techniques may be applicable for non-MTC devices.

Certain aspects of the present disclosure provide a method for wireless communications which may be performed, for example, by a base station (BS). The method generally includes determining a set of resources for a new PBCH with enhanced coverage relative to a legacy PBCH and communicating to at least one user equipment (UE) based on the determined set of resources for the new PBCH.

Certain aspects of the present disclosure provide a method for wireless communications which may be performed, for example, by a UE. The method generally includes determining a set of resources for a new PBCH with enhanced coverage relative to a legacy PBCH and processing the new PBCH from a BS based on the determined set of resources for the new PBCH.

Certain aspects of the present disclosure provide an apparatus for wireless communications. The apparatus generally includes means for determining a set of resources for a new PBCH with enhanced coverage relative to a legacy PBCH and means for communicating to at least one UE based on the determined set of resources for the new PBCH.

Certain aspects of the present disclosure provide an apparatus for wireless communications. The apparatus generally includes means for determining a set of resources for a new PBCH with enhanced coverage relative to a legacy PBCH and means for processing the new PBCH from a BS based on the determined set of resources for the new PBCH.

Certain aspects of the present disclosure provide an apparatus for wireless communications. The apparatus generally includes at least one processor configured to determine a set of resources for a new PBCH with enhanced coverage relative to a legacy PBCH and communicate to at least one UE based on the determined set of resources for the new PBCH. The apparatus also includes a memory coupled with the at least one processor.

Certain aspects of the present disclosure provide an apparatus for wireless communications. The apparatus generally includes at least one processor configured to determine a set of resources for a new PBCH with enhanced coverage relative to a legacy PBCH and process a new PBCH from a BS based on the determined set of resources for the new PBCH. The apparatus also includes a memory coupled with the at least one processor.

Certain aspects of the present disclosure provide a computer program product for wireless communications. The computer program product generally includes a computer readable medium having instructions stored thereon, the instructions executable by one or more processors, for determining a set of resources for a new PBCH with enhanced coverage relative to a legacy PBCH and communicating to at least one UE based on the determined set of resources for the new PBCH.

Certain aspects of the present disclosure provide a computer program product for wireless communications. The computer program product generally includes a computer readable medium having instructions stored thereon, the instructions executable by one or more processors, for determining a set of resources for a new PBCH with enhanced coverage relative to a legacy PBCH and processing a new PBCH from a BS based on the determined set of resources for the new PBCH.

Numerous other aspects are provided including methods, apparatus, systems, computer program products, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 1 is a block diagram conceptually illustrating an example wireless communication network, in accordance with certain aspects of the present disclosure.

DETAILED DESCRIPTION

Aspects of the present disclosure provide techniques and apparatus for enhancing physical broadcast channel (PBCH) coverage for certain user equipments (e.g., low cost, low data rate UEs).

For some systems, certain types of UEs may have limited coverage relative to other types of UEs. For example, some types of low cost UEs may have only a single receive chain, thereby limiting downlink (DL) coverage, while other types of UEs benefit from multiple receive chains. Further, transmit power on a downlink may be limited, and/or a relatively narrow bandwidth may be used to communicate with these types of UEs, reducing frequency diversity gains. Techniques presented herein, however, may help enhance coverage to such UEs.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below.

Example Wireless Communications System

Figure 1:
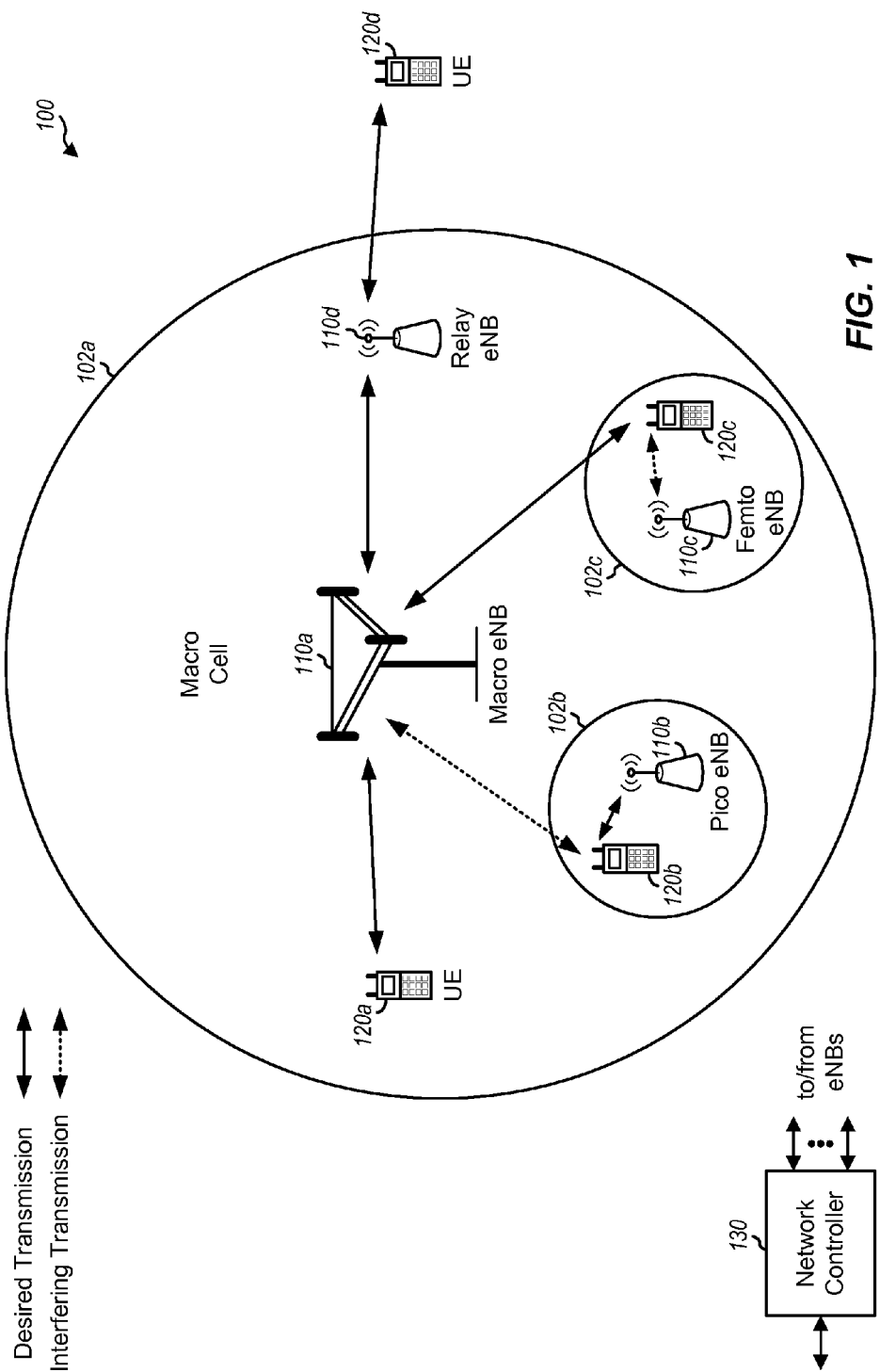

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, etc.

Figure 2:
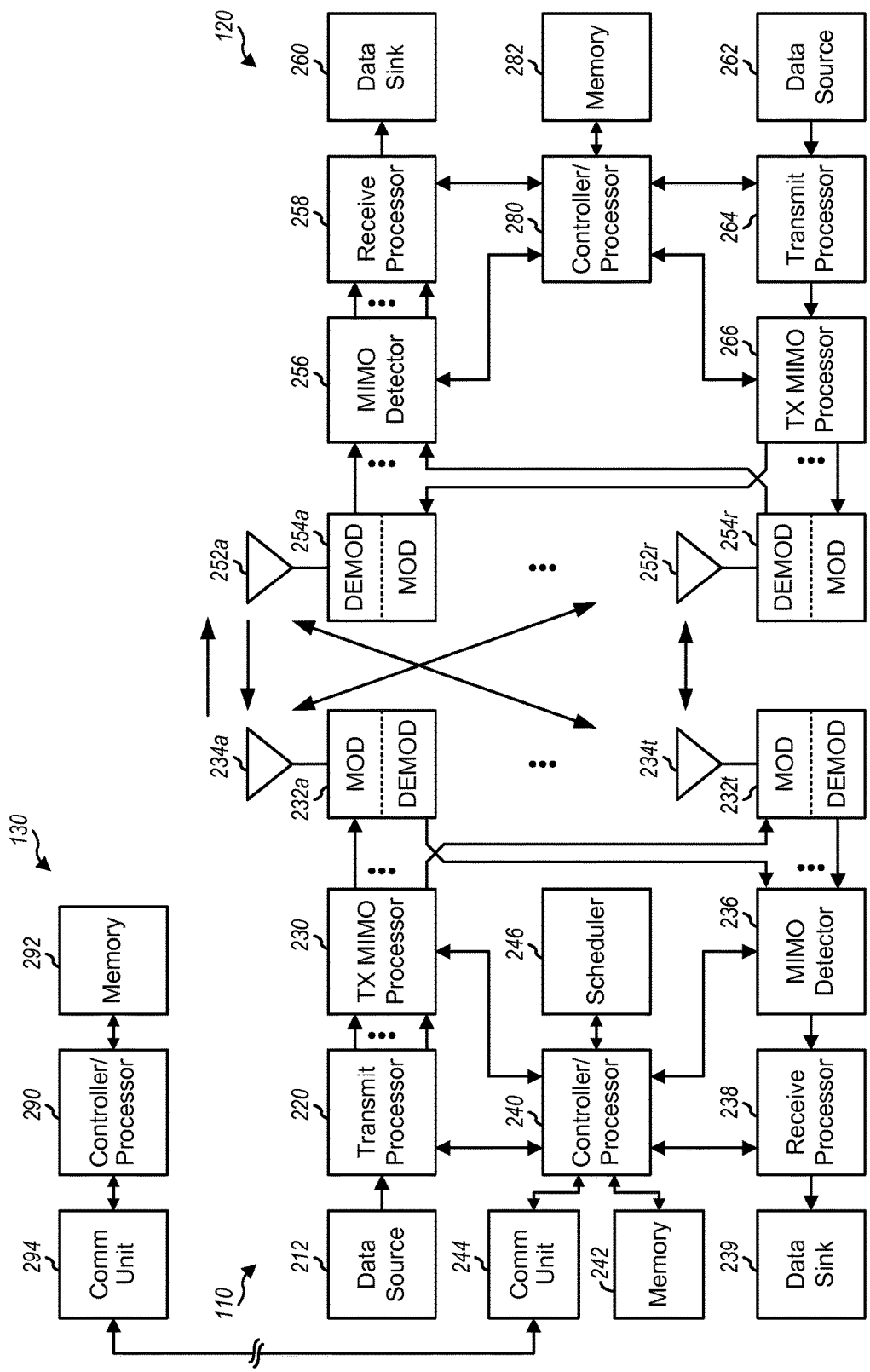
FIG. 2 is a block diagram conceptually illustrating an example of an evolved node B (eNB) in communication with a user equipment (UE) in a wireless communications network, in accordance with certain aspects of the present disclosure.

FIG. 2 is a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein. Memories 242 and 282 may store data and program codes for base station 110 and UE 120, respectively. A scheduler 246 may schedule UEs for data transmission on the downlink and/or uplink.

When transmitting data to the UE 120, the base station 110 may be configured to determine a bundling size based at least in part on a data allocation size and precode data in bundled contiguous resource blocks of the determined bundling size, wherein resource blocks in each bundle may be precoded with a common precoding matrix. That is, reference signals (RSs) such as UE-RS and/or data in the resource blocks may be precoded using the same precoder. The power level used for the UE-RS in each resource block (RB) of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous RBs, wherein at least one reference signal in resource blocks in each bundle are precoded with a common precoding matrix, estimate at least one precoded channel based on the determined bundling size and one or more RSs transmitted from the base station, and decode the received bundles using the estimated precoded channel.

Figure 3:
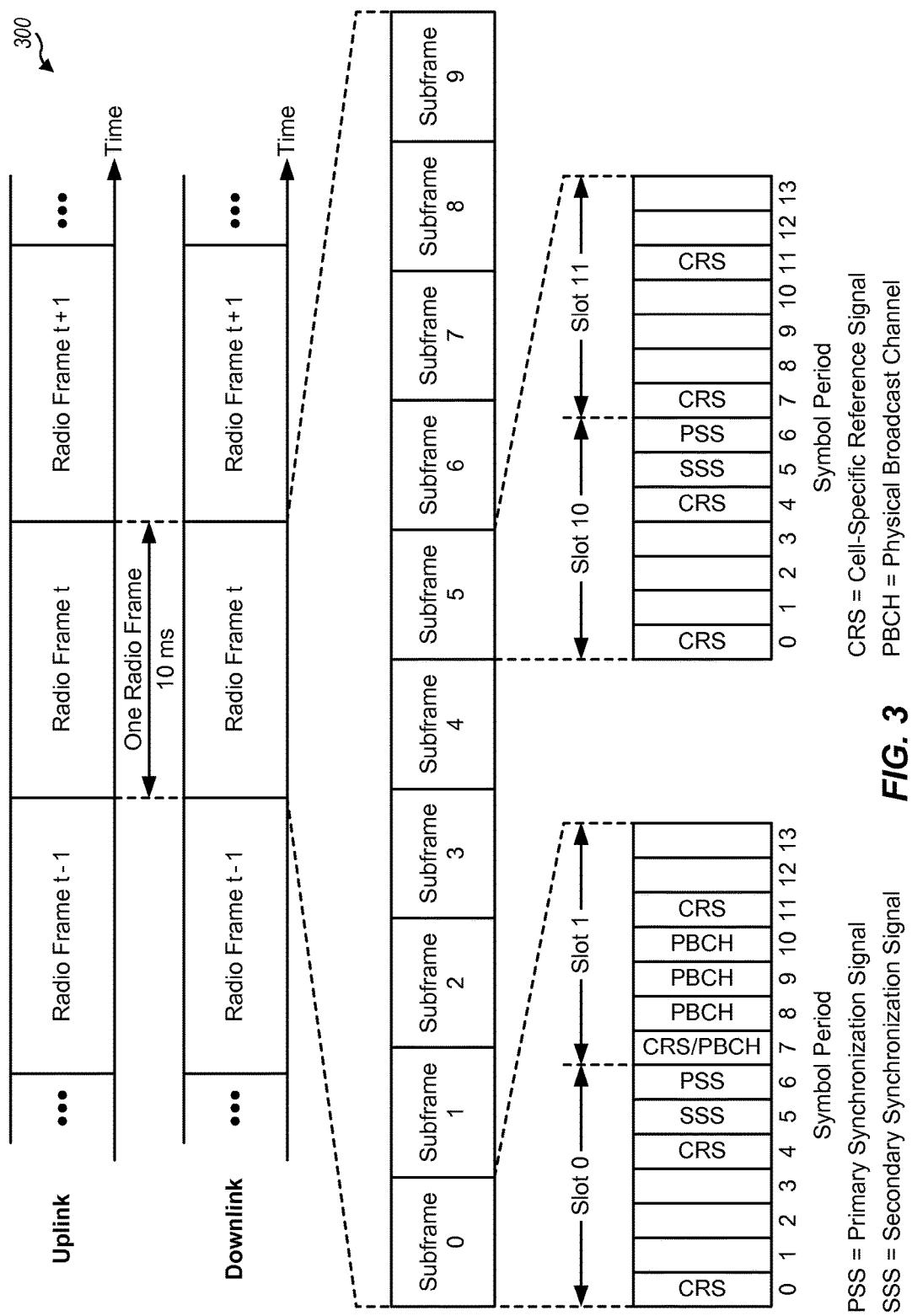
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L-1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
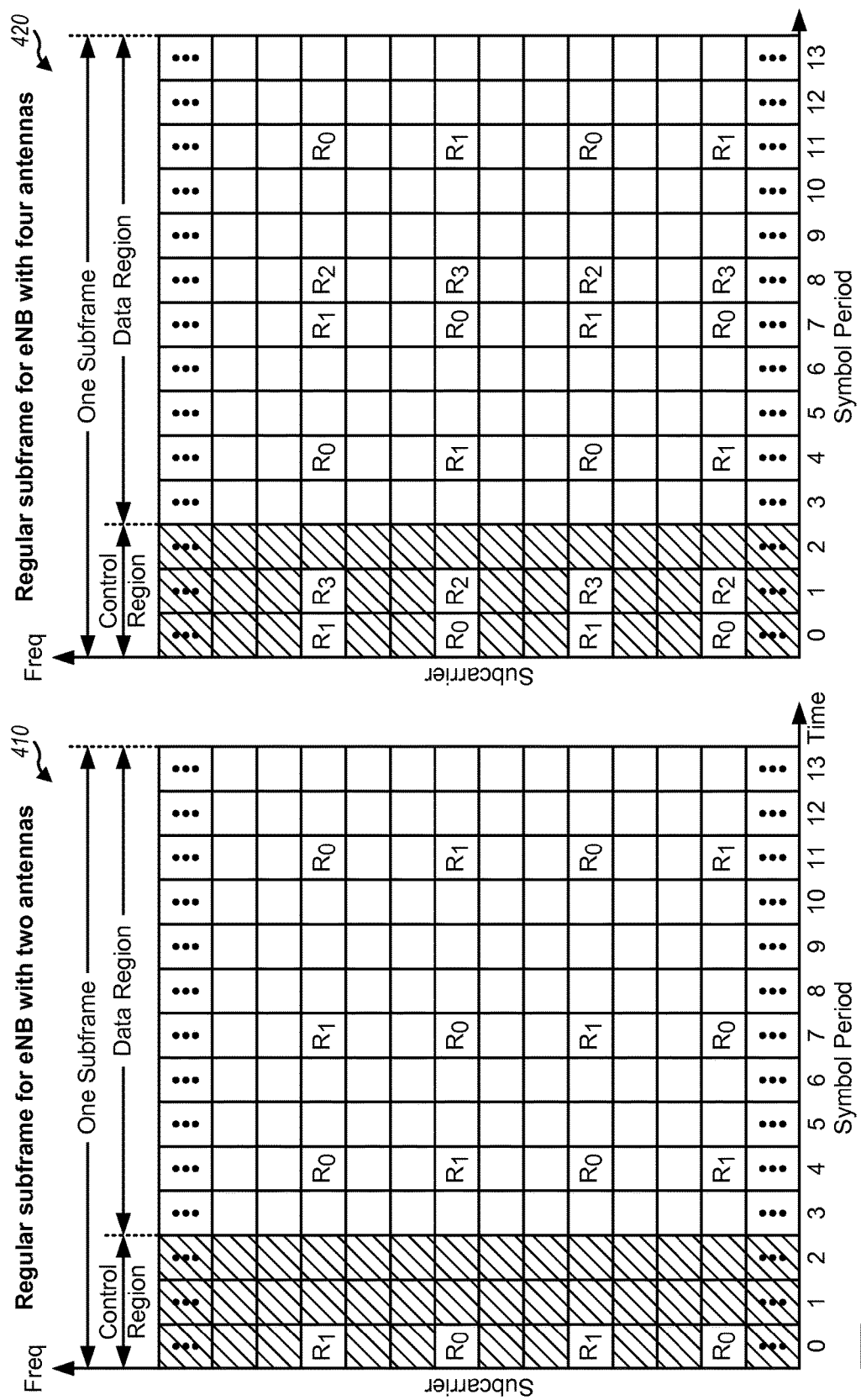
FIG. 4 illustrates example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

Example EPBCH for NCT

According to certain systems (e.g., in long-term evolution (LTE) Release 8/9/10/11), legacy physical broadcast channel (PBCH) is transmitted with a 40-bit payload size. The 40-bit payload consists of an 8-bit system frame number (SFN), a 3-bit physical hybrid automatic repeat request (HARQ) indicator channel (PHICH) information (including the size of PHICH region and whether PHICH is of an extended duration or not), a 4-bit system bandwidth, 9 reserved bits, and a 16-bit cyclic redundancy check (CRC). Further, the payload conveys cell-specific reference signal (CRS) antenna configuration via different CRC masks; 3 CRC masks are defined to convey information about 1, 2, or 4 CRS antenna ports. PBCH is transmitted every 10 ms, but the same information is transmitted in four consecutive transmission opportunities, resulting in a 40 ms periodicity for PBCH information update (40 ms PBCH transmission time interval (TTI)).

Figure 5:
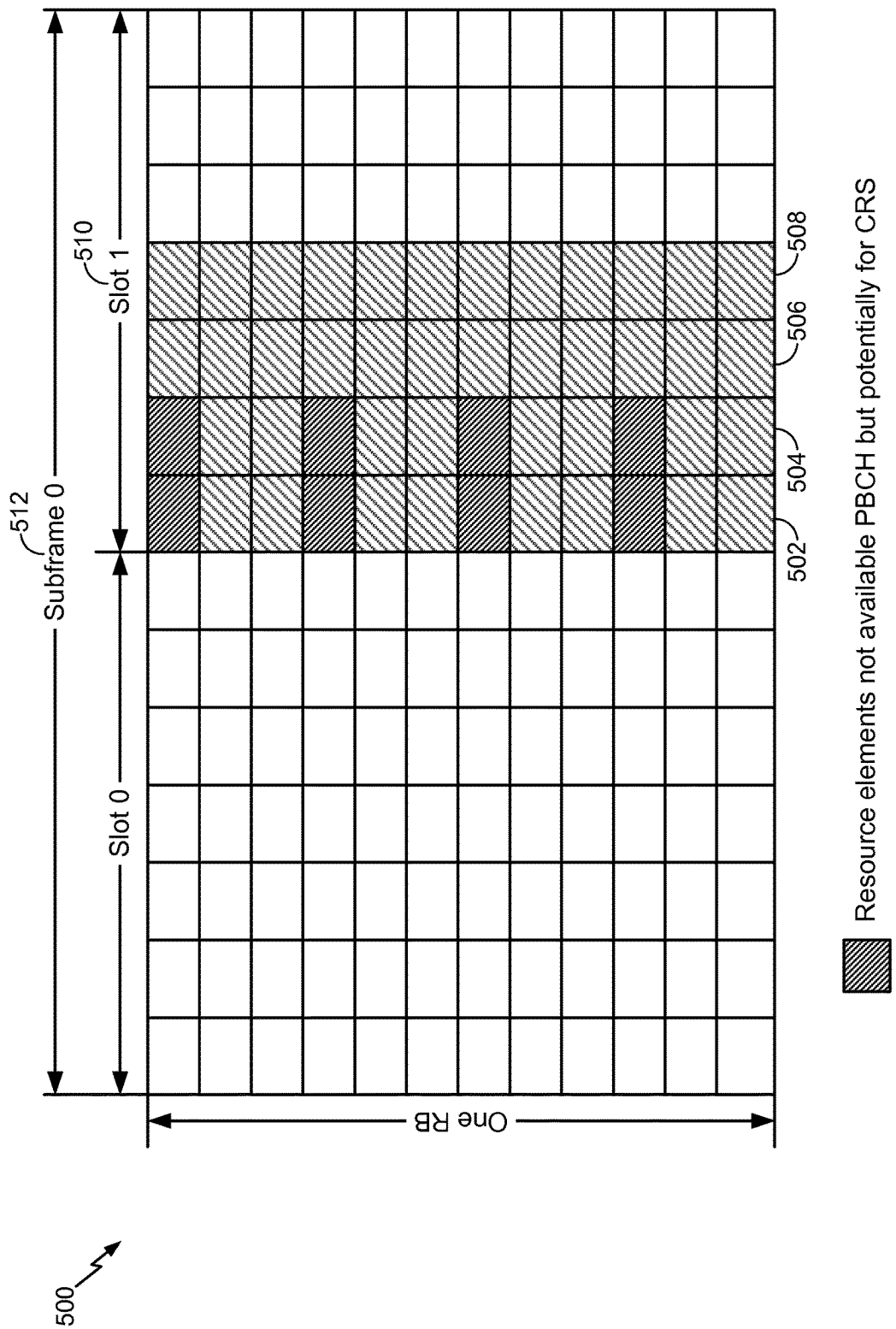
FIG. 5 illustrates an example PBCH format.

FIG. 5 illustrates an example PBCH format 500. PBCH is transmitted using the first four symbols 502, 504, 506, 508 in the second slot 510 of subframe 0 512 in the center 6 resource blocks (RBs), excluding the resource elements (REs) potentially used by CRS (assuming 4-port CRS, irrespective of the actual CRS port configuration).

In certain systems, a New Carrier Type (NCT) will be defined (i.e. in LTE Rel-12). NCT has reduced CRS overhead, for example, CRS may be transmitted only once every 5 ms (versus. in every subframe in legacy carrier type (LCT)), and using 1-port only (versus up to 4 CRS ports in LCT). CRS may not be used for demodulation, rather, it may only be used for time/frequency tracking and possibly reference signal received power (RSRP) measurement. PBCH for NCT in carrier aggregation as secondary carriers are not deemed as necessary, since the relevant information in PBCH can be tunneled to the user equipment (UE) via dedicated signaling. PBCH for standalone NCT may still be necessary. PBCH for NCT may be generally referred to as enhanced PBCH or EPBCH for convenience.

Similar to legacy PBCH, EPBCH may occupy 4 symbols in center 6 RBs and may have a similar number of REs as legacy PBCH. The EPBCH payload size may be different from the PBCH payload size, allowing additional information to be conveyed in EPBCH. The same modulation and coding as PBCH can be used for EPBCH (e.g., quadrature phase-shift keying (QPSK) and tail-biting convolutional coding (TBCC)). TTI period for EPBCH can be the same as legacy PBCH (e.g., 40 ms) or may be different (e.g., 80 ms).

Example TTI Bundling

In certain systems (e.g., LTE Release 8/9/10), TTI (or subframe) bundling may be configured on a per-UE basis. The subframe bundling is configured by the parameter ttiBundling, which is provided by higher layers. Typically, TTI bundling is performed by sending data from a UE in an uplink shared channel over multiple TTIs to the base station, and bundling is not applied to other uplink signals/traffic (e.g., uplink control information). The bundling size may be fixed at 4 TTIs (subframes), that is, the physical uplink shared channel (PUSCH) is transmitted in four consecutive subframes. The same HARQ process number is used in each of the bundled subframes. The resource allocation size may be restricted to no more than three resource blocks (RBs). The modulation order may be set to 2 (i.e., quadrature phase-shift keying (QPSK)). Each bundle may be treated as a single resource so that, for example, a single grant and a single HARQ acknowledgment (ACK) may be used for each bundle, reducing signaling overhead.

TTI bundling is typically used in situations where higher layer segmentation of data packets may introduce unnecessary overhead, such as for low rate traffic. For example, if voice over internet protocol (VoIP) packets cannot be transmitted in a single TTI due to a low uplink link budget, Layer 2 (L2) segmentation may be applied to the VoIP packet to allow it to be transmitted over several subframes. For example, a VoIP packet may be segmented into four radio link control (RLC) protocol data units (PDUs) that are transmitted in four consecutive TTIs. Two to three HARQ retransmission may be targeted to achieve sufficient coverage.

The use of higher layer segmentation of VoIP packets may suffer from several drawbacks. For example, each additional segment introduces a 1 byte RLC, 1 byte medium access control (MAC), and 3 byte L1 cyclic redundancy check (CRC) overhead. This may amount to, for example, a 15% overhead assuming a 33 byte RLC service data unit (SDU) size. In the case of 4 segments, there is an additional L1/L2 overhead of 45%.

Another drawback to higher layer segmentation is that HARQ transmissions/retransmissions for every segment may use grants on PDCCH, consuming significant PDCCH resources. Additionally, each HARQ transmission or retransmission is followed by HARQ feedback on PHICH. Assuming a negative acknowledgment-acknowledgment (NACK-ACK) error ratio of $10^{-3}$ (0.001) the large number of HARQ feedback signals leads to high packet loss probabilities. For example, if 12 HARQ feedback signals are sent, the HARQ feedback error ratio may be on the order of $1.2*10^{-2}$ (0.012). Packet loss rates of more than $10^{-2}$ (0.01) may be unacceptable for VoIP traffic.

Usage of only a single uplink grant and a single PHICH signal per TTI bundle, however, would reduce the signaling overhead described above.

The focus of the traditional LTE design is on the improvement of spectral efficiency, ubiquitous coverage, and enhanced quality of service (QoS) support, etc. Current long term evolution (LTE) system down link (DL) and uplink (UL) link budgets may be designed for coverage of high end devices, such as state-of-the-art smartphones and tablets. However, it may be desirable to support low cost low rate devices as well. For example, for machine type communications (MTC), maximum bandwidth may be reduced, a single receive radio frequency (RF) chain may be used, peak rate may be reduced, transmit power may be reduced, and half duplex operation may be performed.

In addition to low cost, coverage for devices (e.g., MTC devices) in low-coverage environments, such as MTC devices in meters in a basement, for example, may be enhanced. In some scenarios, these devices may have power supply, while others (e.g., gas meters) may operate on battery. Link budget requirements may be increased for these devices. For example, a 20 dB coverage enhancement may be desirable to cover devices in the basement. In order to achieve a larger link budget, large transmission time interval (TTI) bundling may be implemented (e.g., bundling by 100 times for data channels) to achieve a 20 dB link budget gain. For example, on the downlink (DL), TTI bundling may be used for physical broadcast channel (PBCH), physical downlink control channel (PDCCH), enhanced PDCCH, physical hybrid automatic repeat request (HARQ) indicator channel (PHICH), and physical downlink shared channel (PDSCH). On the uplink (UL), TTI bundling may be used for random access channel (RACH), physical uplink control channel (PUCCH), and physical uplink shared channel (PUSCH).

However, such extended bundling may impact system efficiency and power consumption. For PBCH coverage enhancement, repeated transmissions of PBCH content over a long duration may be insufficient because PBCH content is updated every 40 ms (e.g., with system frame number (SFN) change). Accordingly, what is needed is a new design for PBCH with better coverage for some devices, such as MTC devices, while maintaining normal operation of other devices, such as legacy UEs or non-MTC devices.

Example PBCH Coverage Enhancements for MTC

Aspects of the present disclosure provide techniques for enhanced transmission time interval (TTI) bundling design. A base station may determine resources for a new physical broadcast channel (PBCH) with and communicate with a user equipment (UE) based on the new PBCH. For example, according to certain aspects, the new PBCH may be a machine type communications (MTC) PBCH. Additionally or alternatively, the new PBCH may be used by non-MTC devices.

As used herein, the term "new" PBCH generally refers to a PBCH with extended coverage relative to a legacy PBCH which is described in further detail herein. As used herein, the term legacy PBCH generally refers to a PBCH transmitted in accordance with a previous version of a standard (e.g., LTE rel. 10 or earlier), relative to the new PBCH described herein. For example, a legacy PBCH may include a PBCH as shown in FIG. 3. As illustrated, a legacy PBCH is typically transmitted in symbols 0-3 of Slot 1 in a subframe, using the center 6 RBs. A legacy PBCH typically transmitted with a 40 ms or 80 ms period. In contrast, as described further herein, the new PBCH may have different characteristics or design than the legacy PBCH.

Figure 6:
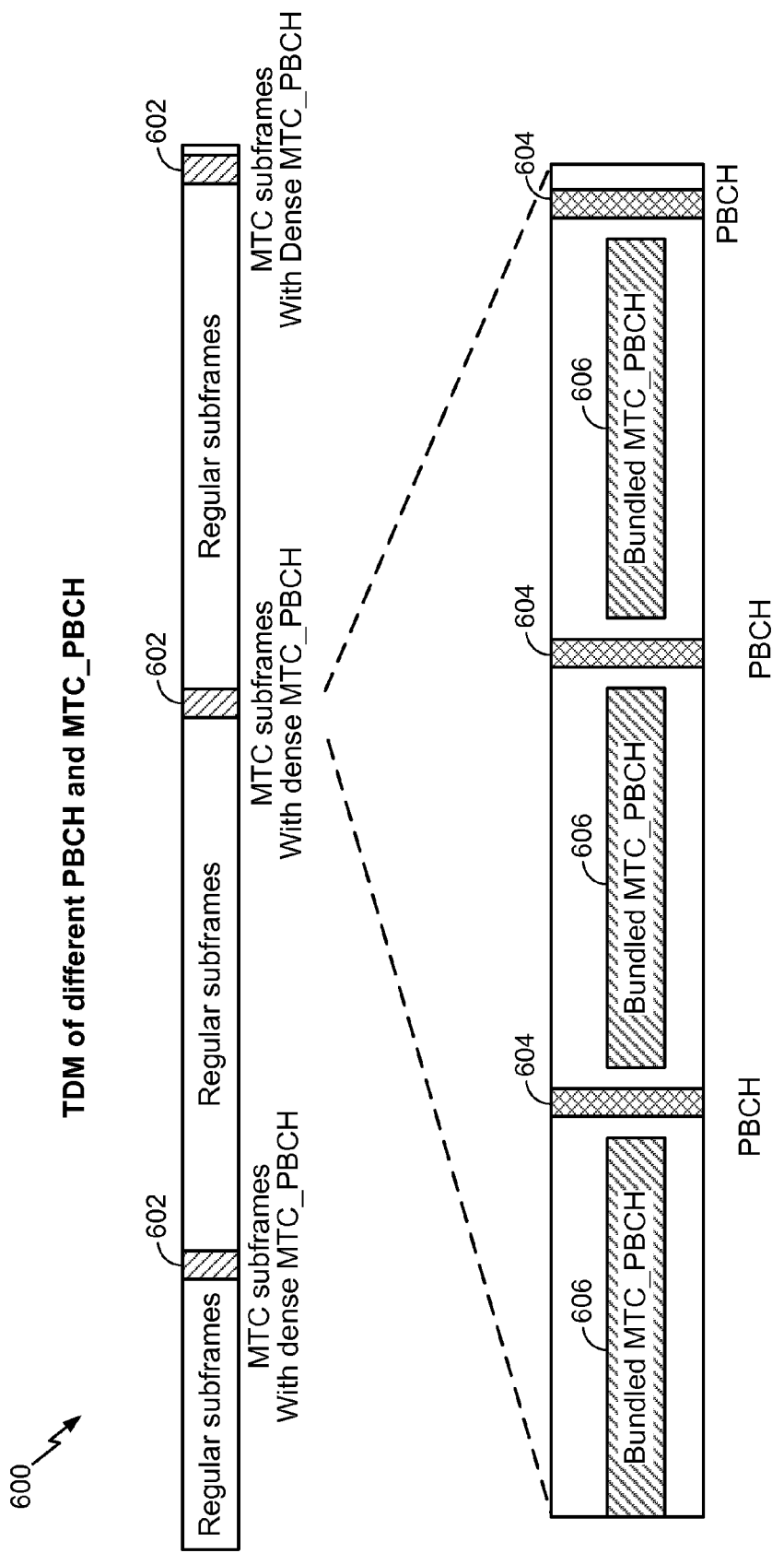
FIG. 6 illustrates example time division multiplexing of PBCH and MTC_PBCH on MTC subframes, in accordance with certain aspects of the present disclosure.

FIG. 6 illustrates time division multiplexing (TDM) of PBCH 604 and PBCH for communication with MTC devices (MTC_PBCH) 606 on MTC subframes 602, in accordance with certain aspects of the present disclosure. In aspects, MTC_PBCH 606 may be densely transmitted in subframes allocated for MTC communications (MTC subframes) 602 and may not be transmitted at all in other subframes (e.g., regular subframes). In aspects, the transmission periodicity for MTC_PBCH 606 may be much larger than for regular PBCH 604 (e.g., 40 ms). As shown in FIG. 6, MTC_PBCH 606 may be transmitted at a narrower bandwidth than PBCH 604, which is typically transmitted at 6 RBs. For example, MTC_PBCH 606 may be transmitted at a bandwidth of 1-2 RBs. Alternatively, MTC_PBCH 606 may be transmitted at a 6 RB bandwidth, but with reduced TTIs.

Figure 7B:
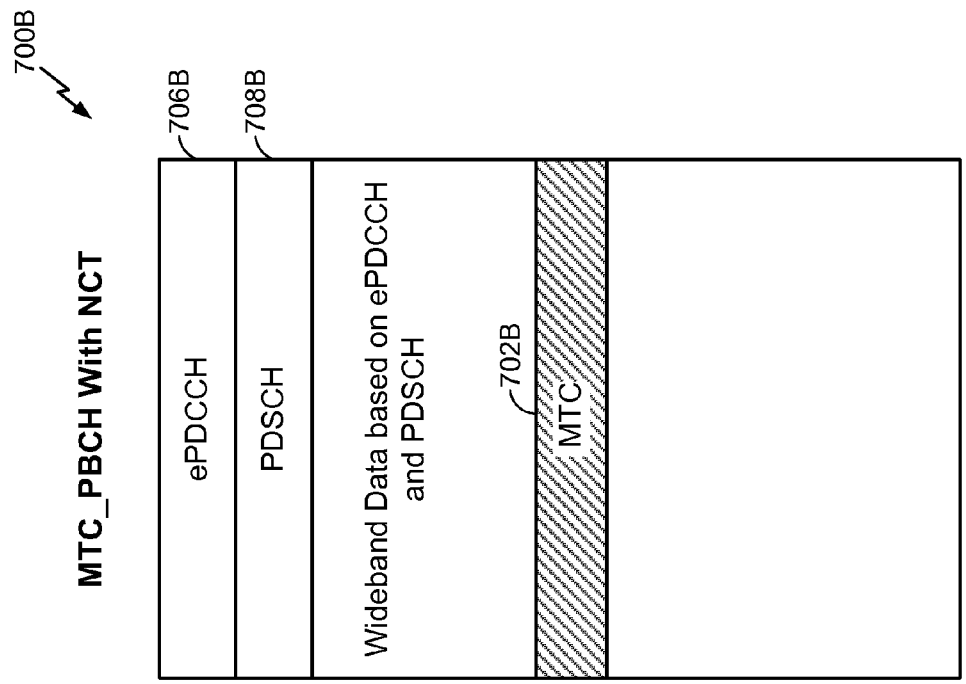
FIG. 7B illustrates example frequency division multiplexing structure of MTC_PBCH with new carrier type (NCT), in accordance with certain aspects of the present disclosure.
Figure 7A:
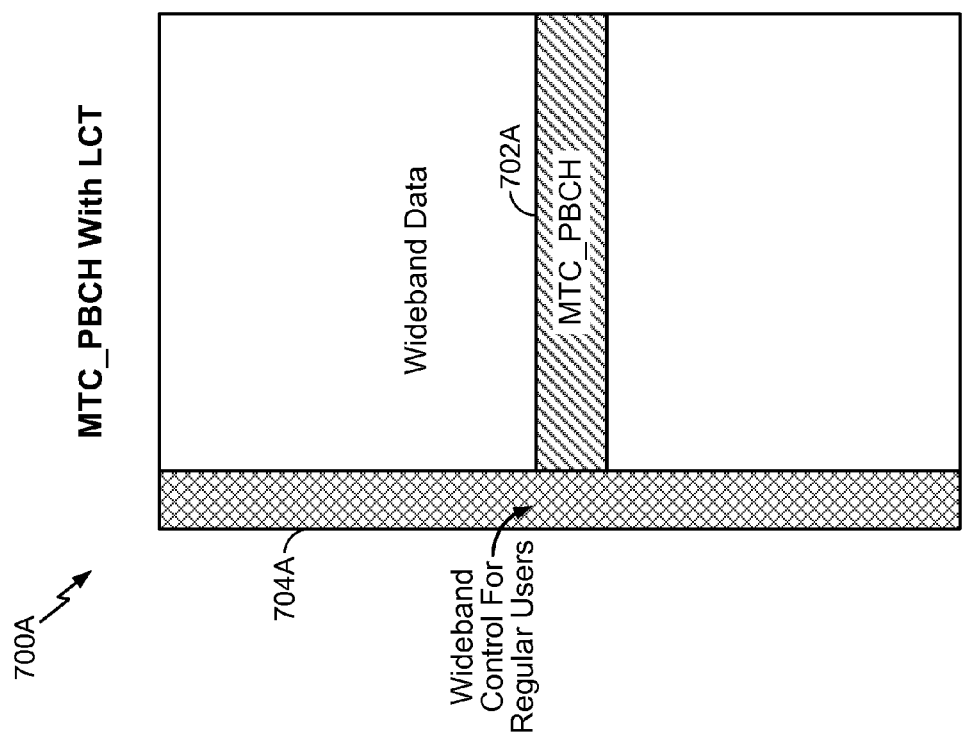
FIG. 7A illustrates example frequency division multiplexing structure of MTC_PBCH with legacy carrier type (LCT), in accordance with certain aspects of the present disclosure.

In aspects, the transmission bandwidth for MTC_PBCH (e.g., MTC_PBCH 606) may be in a continuous frequency location or with hopping. FIG. 7A illustrates frequency division multiplexing (FDM) structure 700A of MTC_PBCH 702A with legacy carrier type (LCT), in accordance with certain aspects of the present disclosure. As shown in FIG. 7A, for legacy carrier type (LCT), MTC_PBCH 702A may be transmitted at 1-2 RBs across less than the entire subframe, with symbols remaining for control 704A. FIG. 7B illustrates FDM structure 700B of MTC_PBCH 702B with new carrier type (NCT), in accordance with certain aspects of the present disclosure. As seen in FIG. 7B, for NCT, MTC_PBCH 702B may span the entire subframe and use FDM with EPDCCH 706B and PDSCH 708B.

To account for legacy control handling, according to certain aspects, MTC_PBCH may span the entire subframe, with rate matching around legacy signals/channels. In aspects, MTC_PBCH may span the entire subframe and may be punctured by legacy signals (e.g., primary synchronization signal (PSS), secondary synchronization signal (SSS), PBCH, cell-specific reference signal (CRS), channel state information reference signal (CSI-RS), and positioning reference signal (PRS)) and/or channels (e.g., physical downlink control channel (PDCCH), physical control format indicator channel (PCFICH), and physical HARQ indicator channel (PHICH)).

In certain aspects, as shown in FIGS. 7A-B, MTC_PBCH may be carrier type dependent or carrier type independent (e.g., legacy carrier type or new carrier type). For carrier type dependent MTC_PBCH, MTC_PBCH may span symbols 4-14 or 5-14 in LCT by excluding the PDCCH and rate matched around CRS in every subframe. In NCT, MTC_PBCH may span the entire subframe and may be rate matched around CRS only every 5 subframes.

For carrier independent MTC_PBCH, MTC_PBCH is carrier type agnostic, and only one format is supported. In aspects, MTC_PBCH may span the entire subframe and may be punctured by legacy signals. Alternatively, MTC_PBCH may span symbols 5-14 and may be rate matched around CRS on all subframes. This may be desirable for simple MTC operation, for example. In another aspect, MTC_PBCH may span symbols 4-14.

Another issue involves legacy signal handling for MTC_PBCH. In aspects, for legacy PSS/SSS/PBCH handling, MTC_PBCH may not be transmitted in subframe 0 and subframe 5. Alternatively, MTC_PBCH may be transmitted in subframes 0 and 5, and is rate matched around PSS/SSS/PBCH. Also, the legacy control region may be excluded, leaving only 4 symbols. In aspects, MTC_PBCH may be punctured by PSS/SSS/PBCH. In aspects, MTC_PBCH may be transmitted in a different frequency location outside the center 6 RBs. In aspects, MTC_PSS and MTC_SSS may be introduced with MTC_PBCH in the same frequency location.

Another issue is EPDCCH handling of MTC_PBCH. In aspects, the eNB may ensure that EPDCCH does not collide with resources allocated for MTC_PBCH. In aspects, EPDCCH may be MTC agnostic. In other words, if EPDCCH does collide with MTC_PBCH, then EPDCCH may puncture MTC_PBCH. Alternatively, if EPDCCH collides with MTC_PBCH, MTC_PBCH may be rate matched around EPDCCH.

According to certain aspects, common search space (CSS) and/or UE-specific search space (USS) EPDCCH resource locations may be such that in subframes with MTC_PBCH, a different set of resource locations may be used than in regular subframes in order to avoid collisions. For example, in MTC subframes, the set of resources may be a punctured (e.g., by MTC_PBCH) version of the set used for regular subframes. In other words, the set of resources in the MTC subframe may be defined based on the set used in regular subframes, but not mapped to the MTC_PBCH REs. Alternatively, EPDCCH may be defined based on the set of resources in the MTC subframes.

According to certain aspects, the eNB may transmit both PBCH and MTC_PBCH. In aspects, a non-MTC UE may monitor only PBCH. MTC_PBCH is similar to a scheduled PDSCH to other users. In aspects, an MTC UE may monitor only MTC_PBCH and ignore regular PBCH.

Figure 8:
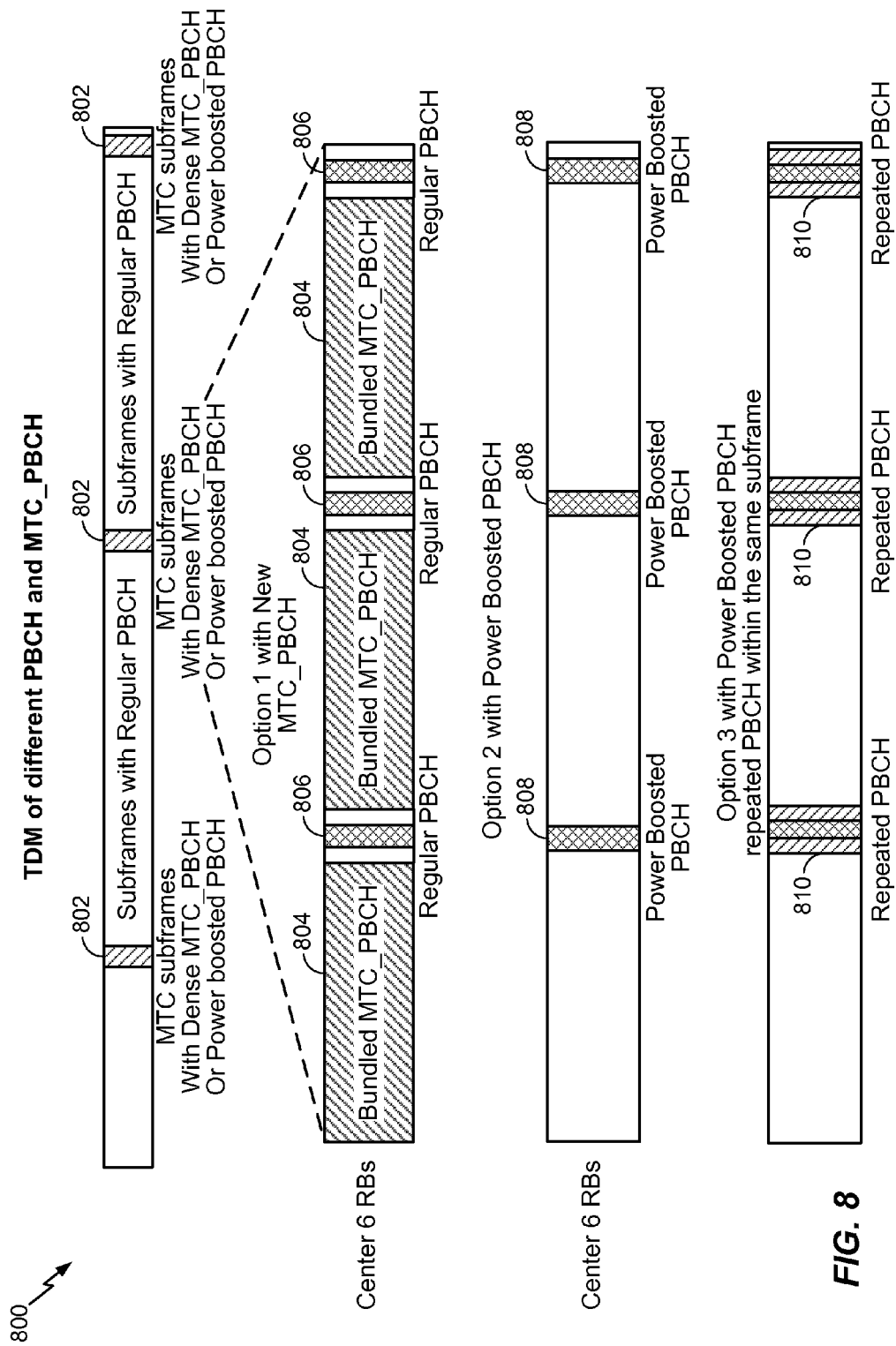
FIG. 8 illustrates example time division multiplexing of PBCH and MTC_PBCH with power boosting, in accordance with certain aspects of the present disclosure.

According to certain aspects, PBCH coverage enhancement may be achieved using other features. For example, MTC_PBCH may be power boosted—transmitted with higher power spectral density (PSD) than other DL signals. FIG. 8 illustrates example time division multiplexing 800 of PBCH and MTC_PBCH with power boosting, in accordance with certain aspects of the present disclosure. As shown in FIG. 8, MTC_PBCH may be transmitted in MTC subframes 802 densely, as described above with respect to FIGS. 6, 7A, and 7B, or with power boost in MTC subframes 802 but transmitted with regular power outside of the MTC subframes 802. For example, as shown in FIG. 8, Option 1, bundled MTC_PBCH 804 may be densely transmitted in the center 6 RBs and regular PBCH 806 may be transmitted. Alternatively, as shown in FIG. 8, Option 2, PBCH 808 may be transmitted with power boosts within the MTC subframes 802. As shown in FIG. 8, Option 3, repeated power boosted PBCH 810 may be transmitted within the same subframe 802. Similarly, in aspects, PSS/SSS may be power boosted in MTC subframes 802, but transmitted at regular power in all other subframes.

Figure 9:
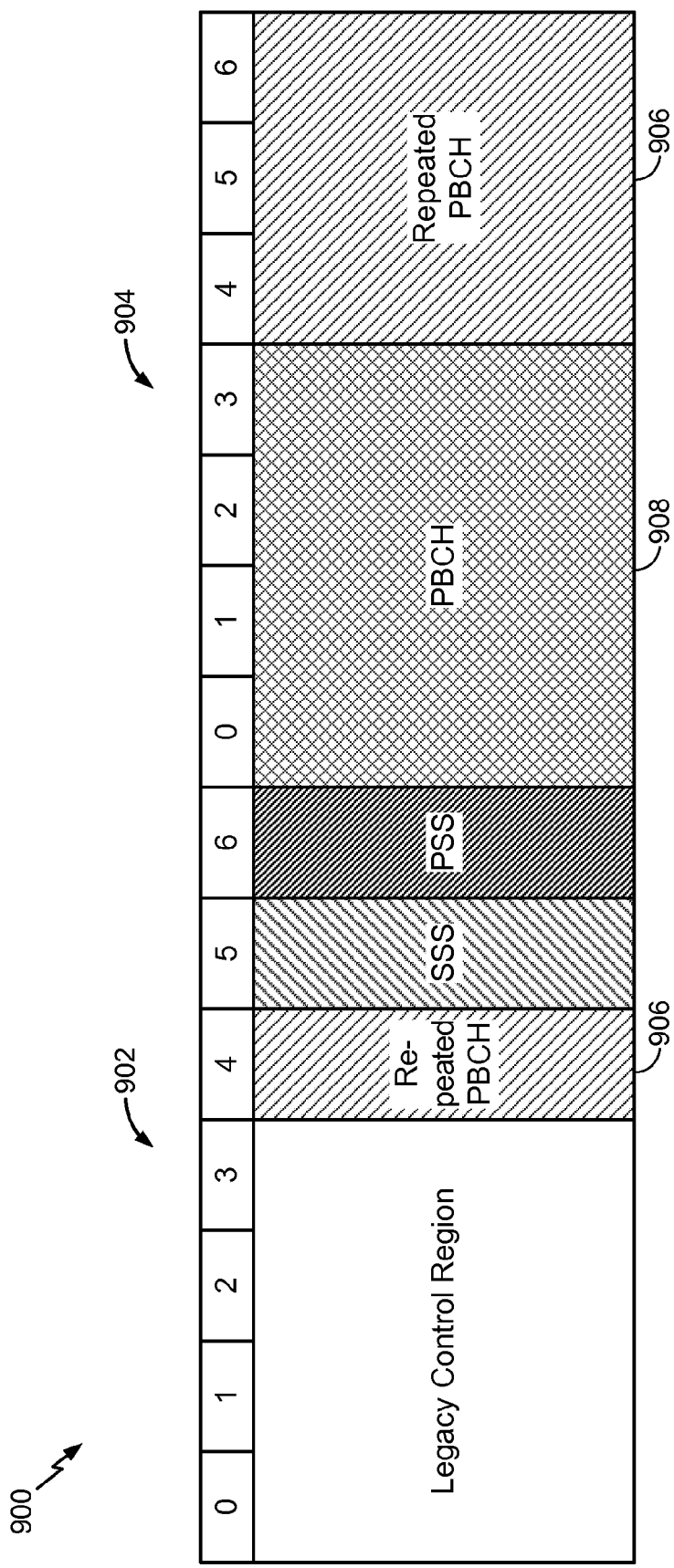
FIG. 9 illustrates example subframe structure with repeated PBCH, in accordance with certain aspects of the present disclosure.

FIG. 9 illustrates example subframe structure 900 with repeated PBCH, in accordance with certain aspects of the present disclosure. In aspects, PBCH may be power boosted and may have a repeated PBCH transmitted in the remaining 4 symbols. As shown in FIG. 9, current PBCH may occupy 4 symbols. PSS/SSS and legacy control regions may be excluded. To increase MTC coverage, PBCH may be repeated in the four remaining symbols (e.g., symbols 4 of slot 0 and symbols 4, 5, and 6 of slot 1 804) in the same subframe 900 as shown in FIG. 9. In aspects, the repeated PBCH 906 and the PBCH 908 may have the same payload content. Alternatively, the PBCH may be repeated only in MTC subframes, and the payload may be different than the payload content of the first regular PBCH.

According to certain aspects, power boosting may be applied to any of PSS, SSS, PBCH, or repeated PBCH. In aspects, the power boosting for PBCH may be different than the power boosting for the repeated PBCH (e.g., PBCH and repeated PBCH may be transmitted at different PSD).

Figure 10:
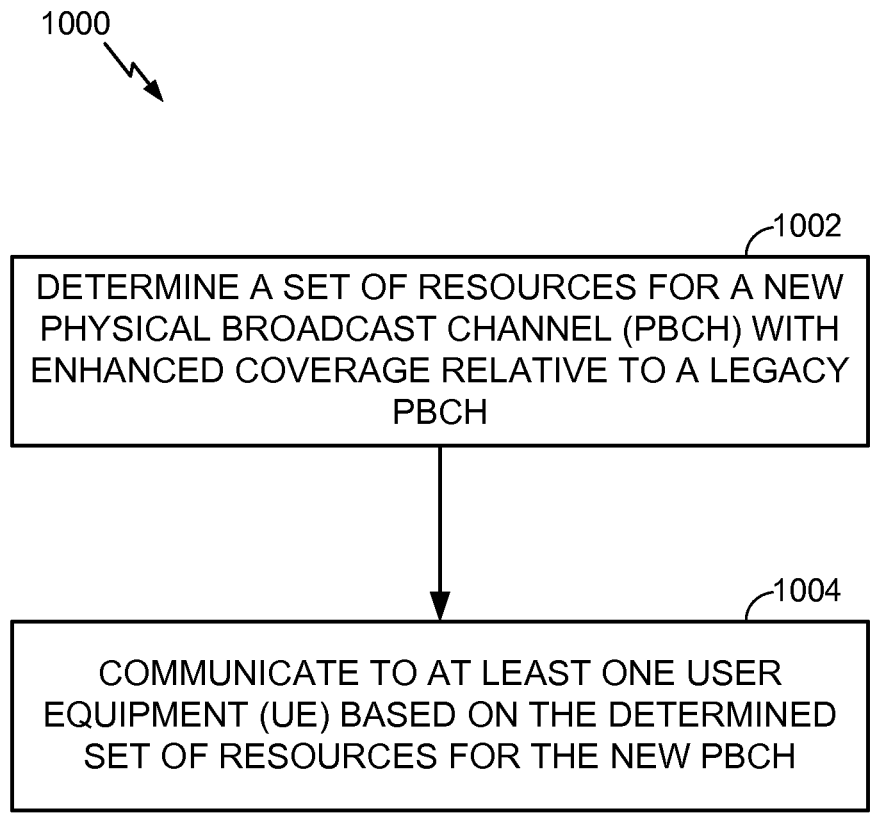
FIG. 10 illustrates example operations for wireless communications which may be performed, for example, by an eNB, in accordance with certain aspects of the present disclosure.

FIG. 10 illustrates example operations 1000 for wireless communications, in accordance with certain aspects of the present disclosure. The operations may be performed, for example, by a base station (e.g., eNB 110). The operations 1000 may begin, at 1002, by determining a set of resources for a new (e.g., MTC) physical broadcast channel (PBCH) with enhanced coverage relative to a legacy PBCH.

At 1004, the BS may communicate to at least one user equipment (UE) based on the determined set of resources for the new (e.g., MTC) PBCH. In aspects, the new PBCH may be transmitted on subframes allocated for communicating with MTC devices (MTC subframes).

In aspects, the new PBCH may have higher density than regular (e.g., legacy) PBCH, for example, as a result of longer transmission time within a subframe than a transmission time for a regular PBCH and increased periodicity of the MTC_PBCH burst coupled with, in some aspects, narrower bandwidth (e.g., 1 or 2 RBs) than a regular PBCH (e.g., 6 RBs). In aspects, the bandwidth for the new PBCH may be at a continuous frequency location or may at locations based on frequency hopping.

In aspects, new PBCH may span the entire MTC subframe. In aspects, the length of the MTC PBCH is different for LCT and NCT. New PBCH may span symbols 4-14 in LCT and may be rate matched around CRS in every subframe. Alternatively, new PBCH may span the entire MTC subframe in NCT and may be rate matched around CRS every 5 subframes.

In aspects, new PBCH may be the same for LCT and NCT. New PBCH may span the entire subframe and may be punctured by PSS, SSS, regular PBCH, CRS, channel state information reference signal (CSI-RS), or positioning reference signal (PRS). In aspects, new PBCH may span symbols 5-14 and may be rate matched around CRS on all subframes. In aspects, MTC PBCH may not be transmitted in subframes 0 and 5. Alternatively, new PBCH may be transmitted in subframe 0 and subframe 5 and may be rate matched around PSS, SSS, and regular PBCH. In aspects, new PBCH may be transmitted in a different frequency location than the center 6 RBs.

According to certain aspects, the BS determine whether EPDCCH collides with resources allocated to the new PBCH. In aspects, if the BS determines EPDCCH collides with the new PBCH, REs of at least some of the new PBCH may be punctured, new PBCH may be rate matched around EPDCCH, or EPDCCH uses a first set of CSS and USS resource locations. In aspects, if the BS determines EPDCCH does not collide with the new PBCH, EPDCCH uses a second set of CSS and USS resource locations. In aspects, the first set of CSS resource locations may be a punctured version of the second set.

In aspects, the BS may transmit new PBCH at higher PSD than other DL transmission signals. In aspects, the BS may transmit regular PBCH at higher PSD than other DL transmission signals on the subframes allocated for communicating with MTC devices. In aspects, the BS may transmit PSS, SSS, and/or SIB for MTC at higher PSD than other DL transmission signals on the subframes allocated for communicating with the MTC devices.

According to certain aspects, regular PBCH may be repeated at least once in the subframe. In aspects, regular PBCH and repeated PBCH transmissions in the subframe have the same payload content. In aspects, regular PBCH may be repeated at least once in each subframe allocated for communicating with the MTC devices. In aspects, PSS, SSS, and legacy control region symbols may be excluded and the regular PBCH may be repeated in four remaining symbols. In aspects, repeated PBCH transmissions in a subframe may have different payload content and the regular PBCH has legacy payload content. In aspects, regular PBCH are transmitted in a subframe at different PSD. In aspects, new PDCH may not be transmitted in subframes where regular PBCH is transmitted.

Figure 11:
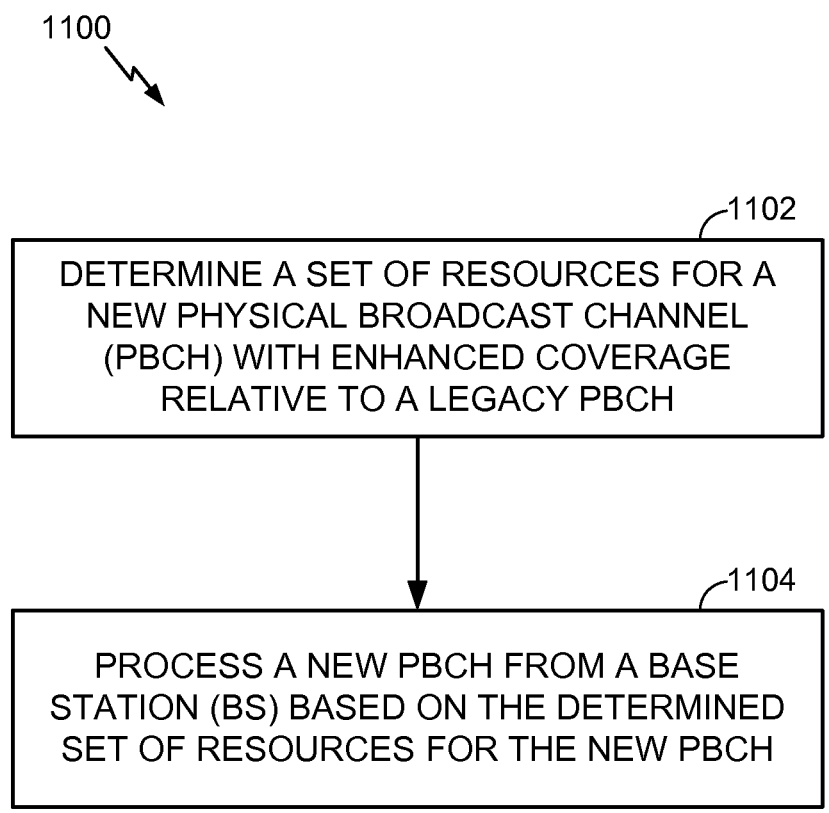
FIG. 11 illustrates example operations for wireless communications which may be performed, for example, by a UE, in accordance with certain aspects of the present disclosure.

FIG. 11 illustrates example operations 1100 for wireless communications, in accordance with certain aspects of the present disclosure. The operations 1100 may be performed, for example, by a UE (e.g., UE 120). The operations 1100 may begin, at 1102, by determining a set of resources for a new (e.g., MTC) physical broadcast channel (PBCH) with enhanced coverage relative to a legacy PBCH.

At 1104, the UE may process a new PBCH from a base station (BS) based on the determined set of resources for the new PBCH.

In aspects, the new PBCH may have higher density than regular PBCH, for example, as a result of narrower bandwidth (e.g., 1, 2, or 6 RBs) and increased periodicity of the MTC_PBCH burst. In aspects, the bandwidth may be at a continuous frequency location or may be frequency hopping.

In aspects, new PBCH may span the entire MTC subframe. In aspects, the length of the new PBCH is different for LCT and NCT. New PBCH may span symbols 4-14 in LCT and may be rate matched around CRS in every subframe. Alternatively, new PBCH may span the entire MTC subframe in NCT and may be rate matched around CRS every 5 subframes.

In aspects, new PBCH may be the same for LCT and NCT. New PBCH may span the entire subframe and may be punctured by PSS, SSS, regular PBCH, CRS, channel state information reference signal (CSI-RS), or positioning reference signal (PRS). In aspects, new PBCH may spans symbols 5-14 and may be rate matched around CRS on all subframes. In aspects, new PBCH may not be received in subframes 0 and 5. Alternatively, new PBCH may be received in subframe 0 and subframe 5 and may be rate matched around PSS, SSS, and regular PBCH. In aspects, new PBCH may be received in a different frequency location than the center 6 RBs.

According to certain aspects, the UE determine whether EPDCCH collides with resources allocated to the new PBCH. In aspects, if the UE determines EPDCCH collides with the new PBCH, REs of at least some of the new PBCH may be punctured, new PBCH may be rate matched around EPDCCH, or EPDCCH uses a first set of CSS and USS resource locations. In aspects, if the UE determines EPDCCH does not collide with the new PBCH, EPDCCH uses a second set of CSS and USS resource locations. In aspects, the first set of CSS resource locations may be a punctured version of the second set.

In aspects, the UE may transmit new PBCH at higher PSD than other DL transmission signals. In aspects, the UE may transmit regular PBCH at higher PSD than other DL transmission signals on the subframes allocated for communicating with MTC devices. In aspects, the UE may transmit PSS, SSS, and/or SIB for MTC at higher PSD than other DL transmission signals on the subframes allocated for communicating with the MTC devices.

According to certain aspects, the above described techniques may be used for non-machine type communications. For example, a new PBCH may be designed using the above techniques for a non-MTC device or smartphone.

According to certain aspects, regular PBCH may be repeated at least once in the subframe. In aspects, regular PBCH and repeated PBCH transmissions in the subframe have the same payload content. In aspects, regular PBCH may be repeated at least once in each subframe allocated for communicating with the MTC devices. In aspects, PSS, SSS, and legacy control region symbols may be excluded and the regular PBCH may be repeated in four remaining symbols. In aspects, repeated PBCH transmissions in a subframe may have different payload content and the regular PBCH has legacy payload content. In aspects, regular PBCH are transmitted in a subframe at different PSD. In aspects, MTC_PDCH may not be transmitted in subframes where regular PBCH is transmitted.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in the Figures, those operations may be performed by any suitable corresponding counterpart means-plus-function components.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available medium that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

As used herein, a phrase referring to "at least one of" a list of items refers to any combination of those items, including single members. As an example, "at least one of a, b, or c" is intended to cover a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a base station (BS), comprising:
   transmitting to a user equipment (UE), by the BS, on a first type of physical broadcast channel (PBCH) that has enhanced coverage relative to a second type of PBCH, wherein transmitting on the first type of PBCH comprises transmitting a PBCH and at least one repeated PBCH within a subframe, and wherein the first type of PBCH has a transmission time interval periodicity greater than 80 ms;
   transmitting on the second type of PBCH to the UE in the subframe, wherein the second type of PBCH is transmitted at a higher power spectral density (PSD) than a PSD for other downlink signals in the subframe; and
   transmitting on the second type of PBCH at a PSD that is not higher than a PSD for the other downlink transmission signals in a second subframe in which the first type of PBCH is not transmitted.

2. The method of claim 1, wherein the first type of PBCH is transmitted on a subframe allocated for communicating with MTC devices.

3. The method of claim 1, wherein the first type of PBCH is transmitted only in 11 symbols of subframe 0 in each radio frame.

4. The method of claim 1, wherein the first type of PBCH is transmitted in subframe 0 and subframe 5 and is rate matched around primary synchronization signals (PSS), secondary synchronization signals (SSS), and the second type of PBCH.

5. The method of claim 1, wherein the first type of PBCH is punctured by primary synchronization signals (PSS), secondary synchronization signals (SSS), and the second type of PBCH.

6. The method of claim 1, wherein the first type of PBCH is transmitted in a different frequency location than a center 6 resource blocks (RBs).

7. The method of claim 1, further comprising:
   transmitting at least one of primary synchronization signals (PSS), secondary synchronization signals (SSS), or system information blocks (SIB in the subframe at a higher PSD than other downlink transmission signals in the subframe.

8. The method of claim 1, further comprising:
   determining whether enhanced physical downlink control channel (EPDCCH) collides with resources allocated to the first type of PBCH.

9. The method of claim 8, wherein:
   if EPDCCH collides with the first type of PBCH, resource elements (REs) of at least some of the first type of PBCH are punctured, the first type of PBCH is rate matched around EPDCCH, or EPDCCH uses at least one of a first set of common search space (CSS) resource locations or a first set of UE-specific search space (USS) resource locations, and
   if EPDCCH does not collide with the first type of PBCH, EPDCCH uses at least one of a second set of CSS resource locations or a second set of USS resource locations.

10. The method of claim 9, wherein the first set of CSS resource locations comprises a punctured version of the second set of CSS resource locations.

11. The method of claim 1, wherein the first type of PBCH is transmitted in the subframe at a higher PSD than a PSD for the other downlink transmission signals in the subframe.

12. The method of claim 1, wherein the first type of PBCH has a higher density in the subframe than a density for the second type of PBCH in the subframe, wherein the density corresponds to an amount of resources in the subframe used for the first type of PBCH or the second type of PBCH.

13. The method of claim 12, wherein the higher density for the first type of PBCH is a result of at least one of a longer transmission time within a subframe for the first type of PBCH than a transmission time within a subframe for the second type of PBCH.

14. The method of claim 1, wherein the first type of PBCH comprises a narrowband PBCH, and wherein a bandwidth for the narrowband PBCH is one resource block (RB).

15. The method of claim 1, wherein the second type of PBCH comprises a repeated PBCH.

16. The method of claim 14, wherein the bandwidth for the narrowband PBCH is at a continuous frequency location.

17. The method of claim 14, wherein the bandwidth for the narrowband PBCH is frequency hopped.

18. The method of claim 1, wherein a length of the first type of PBCH is different for a first carrier type than for a second carrier type.

19. The method of claim 18, wherein:
   in the first carrier type, the first type of PBCH is transmitted in symbols 4-14 and is rate matched around cell-specific reference signals (CRS) in the subframe, and
   in the second carrier type, the first type of PBCH is transmitted in an entire subframe and is rate matched around CRS every 5 subframes.

20. The method of claim 1, wherein the first type of PBCH is the same for a first carrier type and a second carrier type.

21. The method of claim 1, wherein the first type of PBCH is transmitted in the entire subframe and is punctured by at least one of: primary synchronization signals (PSS), secondary synchronization signals (SSS), the second type of PBCH, cell-specific reference signals (CRS), channel state information reference signals (CSI-RS), or positioning reference signals (PRS).

22. The method of claim 1, wherein the first type of PBCH is transmitted in symbols 5-14 of the subframe and is rate matched around cell-specific reference signals (CRS) in the subframe.

23. The method of claim 1, wherein the first type of PBCH is transmitted in only symbols 4-14 of the subframe.

24. The method of claim 15, wherein the second type of PBCH and the first type of PBCH have the same payload content.

25. The method of claim 15, wherein the first type of PBCH is transmitted in each symbol in the subframe that is not occupied by the second type of PBCH, primary synchronization signals (PSS), secondary synchronization signals (SSS), or a control channel.

26. The method of claim 15, wherein the second type of PBCH and the first type of PBCH have different payload content.

27. The method of claim 1, wherein:
the first type of PBCH operates according to release 11 or beyond of the long term evolution (LTE) wireless standards; and
the second type of PBCH operates according to release 10 or earlier of the LTE wireless standards.

28. The method of claim 18, wherein:
the first carrier type operates according to release 11 or earlier of the long term evolution (LTE) wireless standards; and
the second carrier type operates according to release 12 or beyond of the LTE wireless standards.

29. An apparatus for wireless communications by a base station (BS), comprising:
means for transmitting to a user equipment (UE), by the BS, on a first type of physical broadcast channel (PBCH) that has enhanced coverage relative to a second type of PBCH, wherein transmitting on the first type of PBCH comprises transmitting a PBCH and at least one repeated PBCH within a subframe, and wherein the first type of PBCH has a transmission time interval periodicity greater than 80 ms; and
means for transmitting on the second type of PBCH to the UE in the subframe, wherein the second type of PBCH is transmitted at a higher power spectral density (PSD) than a PSD for other downlink signals in the subframe; and
means for transmitting on the second type of PBCH at a PSD that is not higher than a PSD for the other downlink transmission signals in a second subframe in which the first type of PBCH is not transmitted.

30. An apparatus for wireless communications by a base station (BS), comprising:
a transmitter configured to:
transmit to a user equipment (UE), by the BS, on a first type of physical broadcast channel (PBCH) that has enhanced coverage relative to a second type of PBCH, wherein transmitting on the first type of PBCH comprises transmitting a PBCH and at least one repeated PBCH within a subframe, and wherein the first type of PBCH has a transmission time interval periodicity greater than 80 ms; and
transmit on the second type of PBCH to the UE in the subframe, wherein the second type of PBCH is transmitted at a higher power spectral density (PSD) than a PSD for other downlink signals in the subframe; and
transmit on the second type of PBCH at a PSD that is not higher than a PSD for the other downlink transmission signals in a second subframe in which the first type of PBCH is not transmitted.

31. A non-transitory computer readable medium having instructions stored thereon for wireless communications by a base station (BS), the instructions executable by one or more processors, for:
transmitting to a user equipment (UE), by the BS, on a first type of physical broadcast channel (PBCH) that has enhanced coverage relative to a second type of PBCH, wherein transmitting on the first type of PBCH comprises transmitting a PBCH and at least one repeated PBCH within a subframe, and wherein the first type of PBCH has a transmission time interval periodicity greater than 80 ms; and
transmitting on the second type of PBCH to the UE in the subframe, wherein the second type of PBCH is transmitted at a higher power spectral density (PSD) than a PSD for other downlink signals in the subframe; and
transmitting on the second type of PBCH at a PSD that is not higher than a PSD for the other downlink transmission signals in a second subframe in which the first type of PBCH is not transmitted.

\* \* \* \* \*